UNITED STATES PATENT OFFICE.

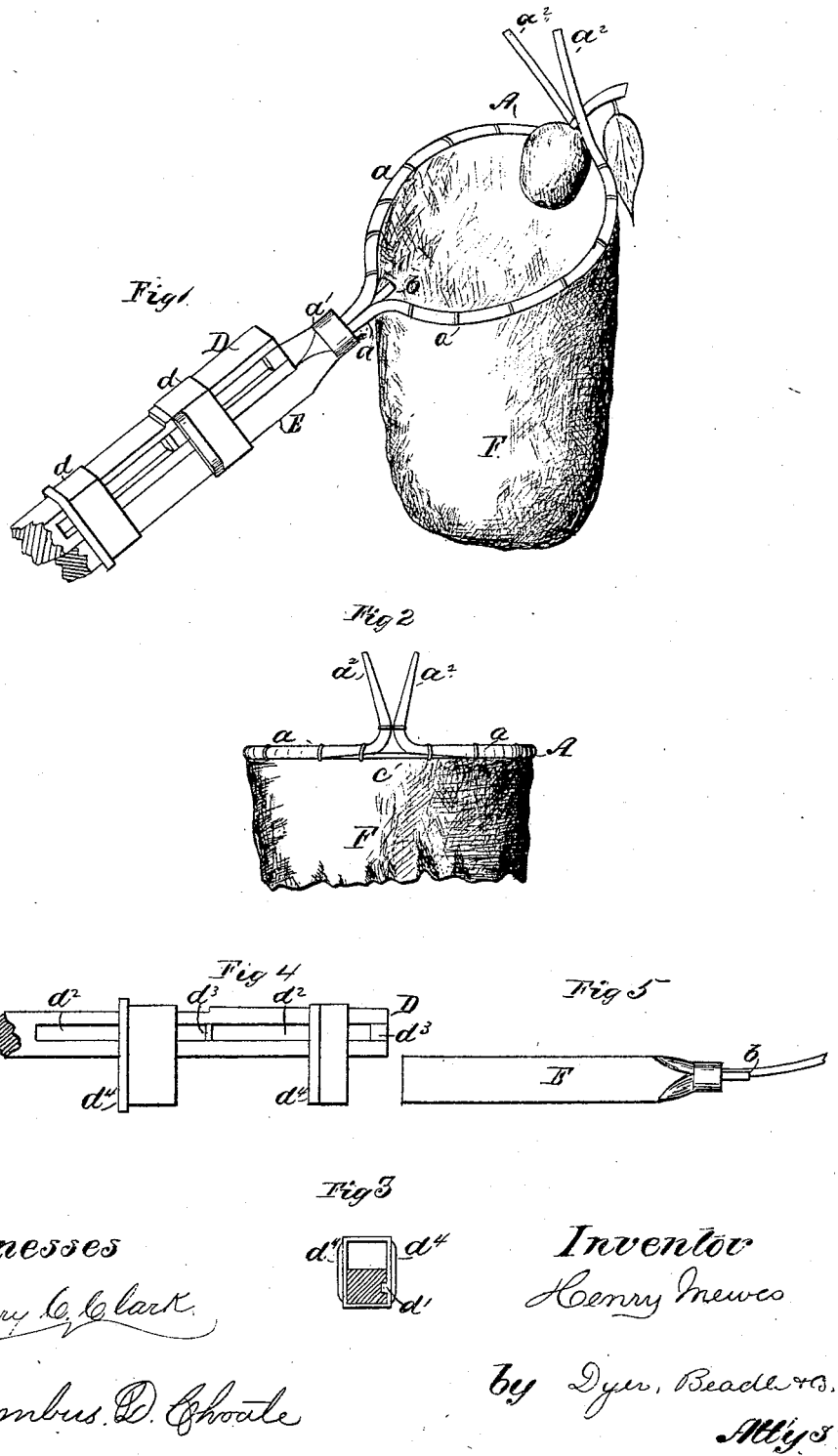

HENRY MEWES, OF BINGHAMTON, NEW YORK.

IMPROVEMENT IN FRUIT-PICKERS.

Specification forming part of Letters Patent No. 139,015, dated May 20, 1873; application filed October 24, 1872.

*To all whom it may concern:*

Be it known that I, HENRY MEWES, of Binghamton, in the county of Broome and State of New York, have invented a new and Improved Fruit-Picker; and I do hereby declare that the following is a full and exact description of the same, reference being had to the accompanying drawing and to the letters of reference marked thereon.

This invention is a fruit-picker of simple construction which can be manufactured and sold at a small cost. Its novelty consists mainly in the employment of a rim provided upon one side with means for attaching it to a pole, and upon the other with a fork for detaching the fruit. It further consists also in the means employed for attaching the picker to the pole or staff, as will be fully described hereinafter.

In the drawing, Figure 1 represents a perresents a perspective view of my invention complete; Fig. 2, a front view of the ring; Fig. 3, an end elevation of one of the couplings; Fig. 4, a side elevation of the pole and its couplings; Fig. 5, a view of the short piece having the ring attached.

To enable others skilled in the art to make and use my invention, I will now proceed to describe fully its construction and manner of operation.

A represents a metal ring, formed preferably of two pieces of wire, $a\ a$, having their central portions bent in semicircular form and their ends, $a^1\ a^1$, upon one side united to form a tapering shank adapted to be driven into the end of a staff or pole. The ends $a^2\ a^2$ of the wire upon the opposite side are so bent that when the two parts are united to form the ring they form a fork, as shown. For the purpose of enabling the shank of the rim to be readily driven without injuring the rim I provide a projecting head or pin, $b$, formed of a suitable piece of wire secured between the ends forming the shank, by welding, as shown. For the purpose of uniting the parts of the rim rigidly together upon the opposite side a supplemental piece, $c$, is used, as shown.

The rim thus constructed may be readily attached to any suitable pole without injury by driving in its shank. I preferably, however, use, in connection with the picker, an independent pole, D, to which the picker is attached, when it is desired to use the same, by means of the short piece E permanently attached thereto. This pole D is made slightly tapering at its upper end, and is provided with couplings, $d\ d$, having guides $d^1$, Fig. 3, by means of which they are adapted to slide in the grooves $d^2$ in the pole, as shown, their motion, however, being limited by stops $d^3$, by which means they are prevented from slipping off and being accidentally lost. For the purpose of permitting these couplings to be driven into place when necessary they are provided with flanges $d^4\ d^4$, as shown. The manner of attaching the picker to the pole is as follows: The couplings are first moved up toward the end of the pole to the extent of their motion in which position they rest against the smallest part of the pole, and consequently expose the greatest area of opening. If the parts are well proportioned the piece E attached to the picker can now be easily inserted into the opening of the couplings, when, by driving down the latter onto the wider part of the pole, the two are securely attached to together. F represents a bag of suitable construction, which is attached to the rim in any suitable manner. The picker is used by grasping the steam of the fruit with the fork and pulling it off, the fork being so arranged relatively to the bag as to deposit the fruit safely therein.

Having thus fully described my invention, what I claim as new, and desire to secure by Letters Patent, is—

The rim A, provided with the shank, driving-pin, and forked ends, as described.

This specification signed and witnessed this 19th day of October, 1872.

HENRY MEWES.

Witnesses:
SEBASTIAN KLAH,
WM. M. CROSBY, Jr.